US008862166B2

(12) United States Patent
Kennard

(10) Patent No.: US 8,862,166 B2
(45) Date of Patent: Oct. 14, 2014

(54) SYSTEM AND METHOD OF RINGTONE SHARING AND TEXT MESSAGE REPLAY

(71) Applicant: Wayne M. Kennard, Lexington, MA (US)

(72) Inventor: Wayne M. Kennard, Lexington, MA (US)

(*) Notice: Subject to any disclaimer, the term of this patent is extended or adjusted under 35 U.S.C. 154(b) by 16 days.

(21) Appl. No.: 13/986,139

(22) Filed: Apr. 4, 2013

(65) Prior Publication Data

US 2013/0303213 A1  Nov. 14, 2013

Related U.S. Application Data

(60) Provisional application No. 61/688,232, filed on May 10, 2012.

(51) Int. Cl.
| | |
|---|---|
| H04W 4/00 | (2009.01) |
| H04M 3/42 | (2006.01) |
| H04M 1/66 | (2006.01) |
| H04B 1/38 | (2006.01) |
| H04N 7/00 | (2011.01) |
| H04N 17/00 | (2006.01) |
| G06F 15/16 | (2006.01) |
| H04W 4/14 | (2009.01) |

(52) U.S. Cl.
CPC .................................. *H04W 4/14* (2013.01)
USPC ........ 455/466; 455/411; 455/414.1; 455/566; 455/557; 348/189; 348/552; 709/206; 709/217; 709/219

(58) Field of Classification Search
USPC ..................... 455/414.1, 411, 466, 566, 557; 709/206, 217, 219; 348/189, 552
See application file for complete search history.

(56) References Cited

U.S. PATENT DOCUMENTS

| | | | |
|---|---|---|---|
| 6,678,535 B1* | 1/2004 | Narayanaswami | 455/557 |
| 2008/0172243 A1* | 7/2008 | Kelly | 705/1 |
| 2014/0162598 A1* | 6/2014 | Villa-Real | 455/411 |

* cited by examiner

*Primary Examiner* — Inder Mehra

(57) ABSTRACT

A system and method are described that is directed to a smart device app that will permit a smart device user to download ringtones from a smart device to a watch configured to receive such ringtones. The watch will is configured such that the complete downloaded ringtone or portions thereof can be used as an audible indicator, such as an alarm, for that watch. The watch is also to receive text messages from the smart device for scrolling across the display window of the watch, which will permit the person wearing a watch to receive and review text messages, and provided limited response without the need to display and use a smart device.

5 Claims, 2 Drawing Sheets

SYSTEM AND METHOD OF RINGTONE SHARING AND TEXT MESSAGE REPLAY

RELATED APPLICATIONS

This application claims the benefit under 35 U.S.C. §119 (e) of U.S. Provisional Patent Application Ser. No. 61/688,232, filed May 10, 2012, entitled "System and Method of Ringtone Sharing and Text Message Replay," which is incorporated by reference herein in its entirety.

FIELD OF THE INVENTION

The present invention relates to systems and methods for wirelessly connecting smart devices and watches, and more particularly relates to systems and methods for connecting smart devices and watches so that a watch can display text messages received by the smart device and use the smart device ringtone for alerting text message reception.

BACKGROUND OF THE INVENTION

It is known that smart devices, such smart phones, have applications ("apps") installed on them by users for many uses. One of the apps that is frequently installed is associated with the ability to download different ringtones over the Internet from ringtone providers. This also makes it possible for smart device users to change their ringtones as often as desired, sometimes more than once a day. This practice of changing ringtones is very popular with teenagers and young adults because, in many cases, the cost for doing so is reasonably low and they all want the newest ringtones available or to fit a particular persona the want to portray to the world.

One of the other attributes of smart devices is they are frequently used for text messaging. Preferably, "texting" involves messages that are less than 160 characters in length. In many cases, text messages are far less than the allotted 160 characters because of the short form type of language that that has been developed and commonly used, for example, "lol" has the meaning "lots of love" or "laughing out loud." It can be readily seen the number of characters that are saved by using "lol."

The style of watch that a number people currently use has a large watch face. Further, many of these watches not only have a precise mechanical timekeeping mechanism but many also include digital electronics that are associated with the watches being battery-powered and in some cases also a digital display. Also, some watches may be all digital. It is also known that watches may be (1) smart devices themselves or (2) remote smart devices that can control a smart phone or be controlled by a smart phone.

Generally, watch alarms or other audible indicators are fixed and not changeable. Further, there is usually a good amount of unused space on the watch face.

It is highly desirable to have a watch that has audible indicators, such as an alarm, that is readily changeable to match a user's smart phone ringtone and also be able to scroll text messages received by the smart phone and provide a limited ability to reply to the text messages using only the watch.

SUMMARY OF THE INVENTION

The present invention is directed to a smart device application ("app") that will permit a smart device user ("system user") to download ringtones from a smart device to a watch configured to receive such ringtones. The watch will be configured such that the complete downloaded ringtone or portions thereof can be used as an audible indicator, such as an alarm, for that watch.

The smart device app of the present invention also will permit a watch configured according to the present invention to receive text messages that are received by the smart device, for replay in scrolling form in the text message window on the watch face. This will permit the person wearing the watch can see the text message without the necessity of bringing out his/her smart device to see the message. The receipt of the text message by the watch can be alerted by the complete ringtone or portions thereof, which will act as an audible text message receipt alert.

In order to carry out the present invention, the smart device must be capable of pairing with the watch. This may be accomplished using the smart device app according to the present invention that is installed on the smart device.

To pair the two devices, the smart device will connect to a chipset on the watch configured to pair with the smart phone. This chipset will include at least a microprocessor, a programmable memory, an input and output subsystems, an electronic subsystem for broadcasting ringtones, and database.

The text messaging pathway is activated through the app on the smart device. The operational protocol for displaying text messages sent from the smart device to the watch is preprogrammed in the watch chipset. As such, a text message display function will be activated from the smart device app. Through a security-based pairing method, the connection between one smart device and one watch, preferably, would be exclusive.

The present invention will be described in greater detail in the remainder of the specification referring to the drawings.

DESCRIPTION OF THE INVENTION

The present invention is directed to a smart device app that will permit a smart device user to download ringtones from a smart device to a watch configured to receive such ringtones. The watch will is configured such that the complete downloaded ringtone or portions thereof can be used as an audible indicator for that watch. The present invention also permit a watch configured according to the present invention to receive text messages that are received by the smart device for scrolling across the display window of the watch, which will permit the person wearing a watch to receive and review text messages, and provide limited responses without the need to display and use a smart device. It is understood, that reference to text messaging is representative of any type of social media messaging including email, all of which are within the scope of the present invention. The present invention will now be described referring to FIGS. 1, 2, and 3.

Figure 1:
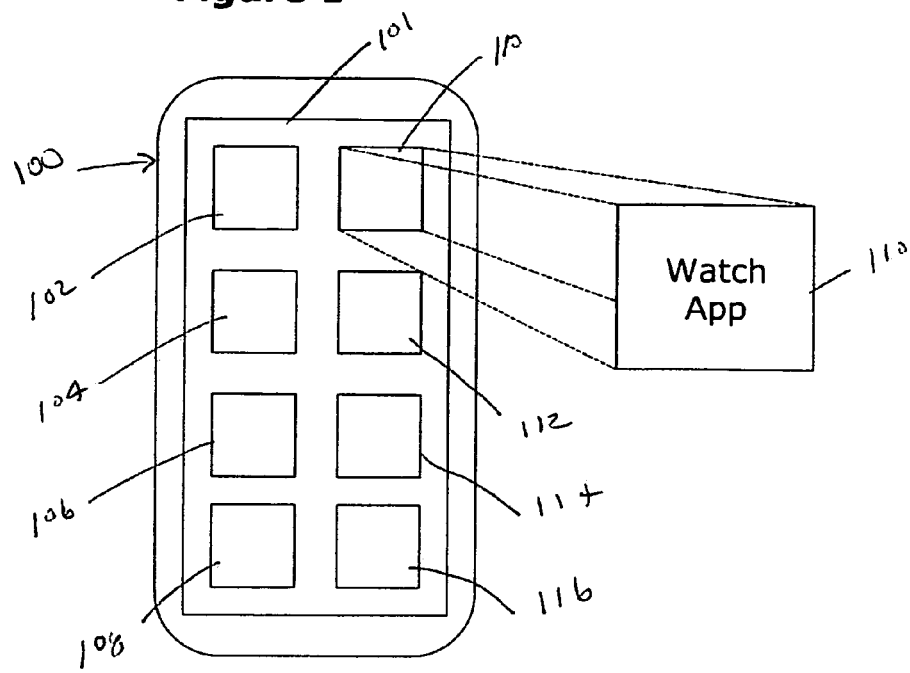
FIG. 1 shows a representative display screen of a smart device, such as a smart phone, according to the present invention with an icon shown for activating smart phone app of the present invention.

Referring to FIG. 1, generally at 100, a smart device in the form of a smart phone is shown. It is understood that other smart devices, such as smart tablet devices, personal digital assistants ("PDAs"), and similar smart devices, are within the scope of the present invention. Accordingly, the use of the term "smart device" or "smart phone" herein will be understood by one skilled in the art to be referring to the general category of smart devices.

Again referring to FIG. 1, smart device 100 preferably has touchscreen display 101. However, it is understood that touching display 101 could be replaced by a non-touchscreen display that is accessed using a rollerball, directional buttons, touchpad, or other control mechanism for accessing displayed icons, and it would still be within the scope of the present invention.

As shown in FIG. 1, touchscreen display 101 includes a number of smart device app icons associated with apps that have been installed on the smart phone. These apps include the ones shown at 102, 104, 106, 108, 110, 112, 114, and 116. The apps can be for any number of purposes. Therefore, there can be more or less than eight installed apps on smart device 100 and it would still be within the scope of the present invention. However, referring to watch 110, eight representative apps are shown on smart device display 101.

Figure 2:
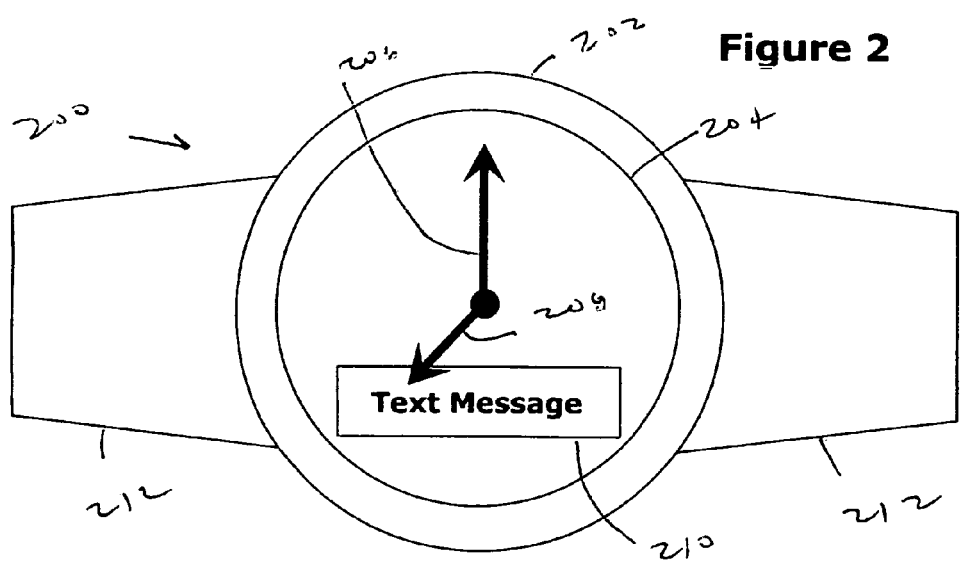
FIG. 2 shows an elevated top view of a watch configured according to the present invention that has a text message scrolling window for reviewing text messages received by smart device.

As shown in FIG. 1, the smart device app icon at 110 is titled "Watch App." Watch App 110 when activated will be used for communications between smart device 100 and watch 200 (FIG. 2). Preferably, the communications link between smart device 100 and watch 200 is a wireless connection. However, it would be understood by one skilled in the art that the connection could be a wired connection and is still be within the scope of the present invention.

Referring to FIG. 2, generally at 200, a watch configured according to the present invention shown. A watch 200 configured according to the present invention, preferably, will include a chipset (not shown). Preferably, this chipset will include at least a microprocessor, a programmable memory, an input and output subsystems, an electronic subsystem for broadcasting ringtones, and database.

The microprocessor is for controlling the electronic portions the watch, the programmable memory is for storing the operating system for the watch chipset. The programmable memory will store the operating system. The input and output subsystems will the control of the wireless flow of electronic information to and from the watch. The electronic subsystem for broadcasting ringtones will cause the electronic generation of an audible ringtone. The database is for storing downloaded ringtones and other information. It is understood that the watch according to the present invention may include a timing mechanism for operation of the watch and an electronic portion for providing other services to the watch. Further, it is understood that the watch may be completely digital.

Again referring to FIG. 2, preferably, a watch configured according to the present invention will include watch body 202, watch face 204, watch hands 206 and 208, text message box 210, and watch band 212. Preferably, the chipset (not shown) is disposed within watch body 202 such that it will not interfere with the timing mechanism for operation of the watch for keeping time. Further, preferably, watch face 206 will be of an appropriate size, whether circular, rectangular, or otherwise, that will have sufficient space for text message window 210 to scroll text messages received by the smart device and transmitted, preferably, in real-time to the watch for reading by the watch owner. If, watch face 204 has a somewhat smaller size, the cover over text message window 210 can have magnifying properties to increase the size of the scrolled message characters to make it easier to read.

Figure 3:
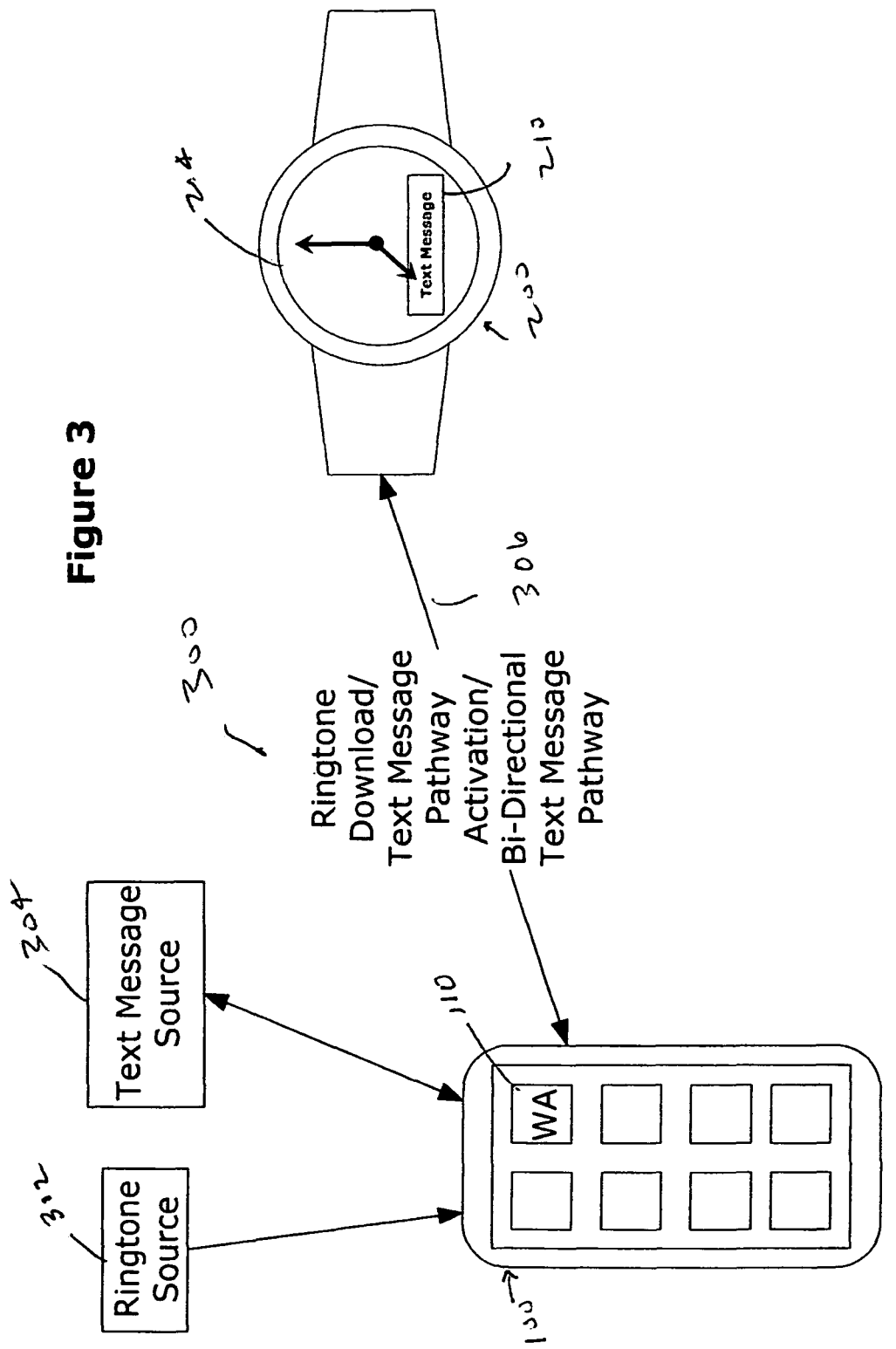
FIG. 3 shows a representative diagram of a smart device and a watch configured according to the present invention and the communications that takes place between the smart device and watch for carrying out the present invention.

Referring to FIG. 3, generally at 300, a diagram is shown of smart device 100 and watch 200 configured according to the present invention and the communications that takes place between the smart device and watch for carrying out the present invention. For purposes of understanding the communications between smart device 100 and watch 200 the following is provided.

A system user who desires to change his/her ringtone for smart phone 100 will download and store the new ringtone on smart device 100 in memory. Once this is done, when an incoming call comes to smart device 100, the new downloaded and stored ringtone will play. The smart phone user's selection of ringtones may be from those presently stored in memory on the smart phone or from an Internet source of ringtones. The ringtone that is downloaded and stored on smart device 100 may be a depiction of the persona that this user wants to portray to the world.

Again referring to FIG. 3, the smart device user will receive new ringtones from ringtones source 302 when the system user desires to change his/her ringtone. Once the new ringtone is downloaded and stored on the smart device, through the activation and use of watch app 110, the system user can download a new ringtone from smart device 100 to watch 200 so that the ringtone can be used as an audible indicator, such as an alarm, for the watch and to indicate that a new text message has been received by the watch for the display in display window 210 on watch face 204.

Watch app 110 also will be used for the activation of the text message pathway between smart device 100 and watch 200. Once the text message pathway is activated, text messages that smart device 100 receives from text message source 302 will be replayed in text message window 210 of watch 200.

As stated, watch 110 may have buttons (not shown) that may be used for providing limited responses to text messages to be sent from the watch. If a response is provided, it will be transmitted back over connection 306 to smart device 100, and the smart device that will transmit the response to the entity that sent the text message.

So that the watch will not drain too much power from the battery for text messaging operations, it may have a limited ability for the text message recipient to reply to text messages that are received through the use of preprogrammed responses. For example, there could be two response buttons on the watch, and if the first is pressed, it may reply through the smart device "Busy, can't talk now" and if the second is pressed, it may reply through the smart device "Stay there, I will be back to you in 10 minutes." It is understood that these are just examples and other than two buttons may be used and other methods besides buttons can be used and still be within the scope of the present invention. What is understood is that watch 200 can provide responses to text messages that are transmitted to smart device 100, and from smart device 100 to the original text message sender.

It is understood that communications between smart device 100 and watch 200 will be over communications line 306. Communications line 306 may be a Bluetooth, 802.11x, or other type of wireless connection and still be within the scope of the present invention. Further, the smart device may be based on a BlackBerry operating system, Apple operating system, Android operating system, or other operating system and still be within the scope of the present invention as long as a wireless communication link can be effected between the smart device 100 and watch 200 to carry out the functions of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Further, while the above description describes the present invention with specificity, it is not to be construed as limiting on the scope of the invention, but only as exemplifications of the presently preferred embodiments thereof. Many other modifications and variations are possible within the teachings of the invention and any and all equivalents.

The invention claimed is:

1. A computer-based system for ringtone use and text message display on a watch, comprising:
 a smart device being capable of electronically downloading a ring tone from a ring tone source and receiving text messages from a text message server, with the smart device including an application ("app") for downloading ringtones to a watch and downloading text messages received by the smart device to the watch;
 the watch including a chipset with at least a microprocessor, programmable memory, and a database for receiving, storing, and playing the downloaded ringtones and playing such ringtones to indicate at least the receipt of a text message, for receiving and displaying text messages downloaded from the smart device, and providing a user with an ability to provide responses to text messages that are transmitted from the watch to the smart device and thereafter transmitted from the smart device to the text message server or received by the entity that sent the original text message; and
 a wireless communications link between the smart device and the watch.

2. The system as recited in claim 1, wherein the chipset further includes input and output subsystems.

3. The system as recited in claim 1, wherein the chipset further includes an electronic subsystem for generating audible ringtones.

4. The system as recited in claim 1, wherein the ringtone downloaded from the smart device to the watch will match the ringtone of the smart device.

5. The system as recited in claim 4, wherein the ringtones for the smart device and watch are capable of being changed multiple times in a 24-hour period.

* * * * *